United States Patent
Butterfield et al.

(10) Patent No.: US 7,639,389 B2
(45) Date of Patent: Dec. 29, 2009

(54) MEMORY FOR DIAGNOSING IMAGING COMPONENT FAILURE

(75) Inventors: Paul M. Butterfield, Ontario, NY (US); Mark A. Gwaltney, Fairport, NY (US); Connie F. Purdum, Rochester, NY (US); Carlos O. Alva, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 587 days.

(21) Appl. No.: 11/609,409

(22) Filed: Dec. 12, 2006

(65) Prior Publication Data

US 2008/0137124 A1 Jun. 12, 2008

(51) Int. Cl.
  *G06K 15/02* (2006.01)
  *G06T 3/40* (2006.01)
  *G06F 3/12* (2006.01)
  *H04N 1/393* (2006.01)

(52) U.S. Cl. .................. 358/1.2; 358/3.24; 358/3.26; 358/1.13; 358/1.16; 358/406

(58) Field of Classification Search .......... 358/1.9, 358/1.2, 3.24, 3.26, 1.13, 1.15, 1.16, 504, 358/406, 442, 444, 451; 382/112, 298–299; 702/108

See application file for complete search history.

(56) References Cited

U.S. PATENT DOCUMENTS

| 4,251,153 | A |   | 2/1981  | Levine           |         |
|-----------|---|---|---------|------------------|---------|
| 4,630,129 | A |   | 12/1986 | Hayashi et al.   |         |
| 4,949,105 | A |   | 8/1990  | Prowak           |         |
| 5,001,655 | A | * | 3/1991  | Higano et al.    | 702/108 |
| 5,081,494 | A |   | 1/1992  | Reed et al.      |         |
| 5,140,675 | A |   | 8/1992  | Okada            |         |
| 5,182,651 | A |   | 1/1993  | Kishi            |         |
| 5,258,810 | A |   | 11/1993 | Bresina et al.   |         |
| 5,351,074 | A |   | 9/1994  | Kadowaki et al.  |         |
| 6,573,918 | B2|   | 6/2003  | Kobayashi et al. |         |

\* cited by examiner

*Primary Examiner*—Scott A Rogers
(74) *Attorney, Agent, or Firm*—Michael J. Nickerson; Basch & Nickerson LLP

(57) ABSTRACT

Test image data is introduced into the image processing path of a marking device, at various points prior to the marking engine. Comparison of output of the marking engine from various sources of image data is made to diagnose imaging path component failure. Imaging data at various points in the image processing path is captured for analysis as part of component failure diagnosis. Various memory devices are used to both introduce test data at various points in the image processing path and capture data at various points of the image processing path.

11 Claims, 2 Drawing Sheets

MEMORY FOR DIAGNOSING IMAGING COMPONENT FAILURE

BACKGROUND

Images produced by printers, fax machines and other marking devices are ubiquitous in the industrialized world. Users of marking devices have come to expect high image quality. Hence, poor quality images, containing undesirable artifacts, often result in a waste of worker productivity and media resources and could even result in the miscommunication of important information. Therefore, one metric for determining the business value of a printer, for example, as well as of other types of marking devices, is dependent upon the printer's imaging quality.

A conventional printing system is illustrated in FIG. 1, wherein the printing system includes an image output terminal 200 and a raster image processing engine 100. The raster image processing engine 100 receives image data 10 (an image file, a portable document format file, electronic document, or other electronic form of data containing data to be printed by the image output terminal 200).

The raster image processing engine 100 includes a rasterizer 110 that rasterizes the image data 10 before storing the processed image data in memory 120. The rasterizer 110 may perform portable document language interpretation, trapping, and/or anti-aliasing. The stored processed image data is processed by a post rasterizer 130. The post rasterizer 130 may perform calibration and/or tone-response-curve adjustment.

The raster image processing engine 100 also includes a port or ports to allow the user to input test image data (300 and 400) for calibration or diagnostic purposes. Moreover, the port or ports allow the user to sample (not shown) the processed test image data to determine the quality of the raster image processing engine 100 and the various components of the raster image processing engine 100.

Upon being processed by the raster image processing engine 100, the processed image data is, for example, binarized by image binarizer 210 of the image output terminal 200. It is noted that for purposes of describing the conventional printing system, the print engine is a binary printer, namely the depth resolution of a pixel is one bit.

The image binarizer 210 prepares the image data so that the image data is printer dependent and at the proper resolution for rendering by the marking engine of the image output terminal 200. Thereafter, a register image module 220 makes any final adjustments to the image data with respect to registration and converts the image data into appropriate signals to be utilized by the imager 230. The imager 230 may be a laser for a xerographic printer or a printhead for ink printer.

The conventional image output terminal 200 also allows the user to input test image data (500) for calibration or diagnostic purposes. However, the user cannot, conventionally, sample the processed test image data from image binarizer 210 to determine the quality of the image binarizer 210. The best that a user can do, conventionally, is to look at a test print, which may not provide enough distinguishable information to isolate the source of the problem within an image output terminal.

More specifically, image quality problems within an image output terminal can be caused either from failures in the marking engine or in the binarization of the image data. Many of these problems render indistinguishable artifacts, thereby making it very difficult to determine root cause (source) of the artifact.

In other words, the hardware or software utilized in the printing system may fail, causing the marking engine to produce undesirable artifacts on the printed medium. Although the cause of the failure may be malfunction of one of the different processes or components, each failure may produce the same undesirable artifact on the printed medium. Thus, the user of the printer may recognize a failure, but the artifact will not provide enough information to the user so as to determine the point of failure.

As noted above, a conventional printing system provides some diagnostic capabilities with respect to isolating problems in the raster image processing engine. However, if the problem is in the image output terminal, the conventional printing system does not provide adequate diagnostic capabilities with respect to isolating problems between the image binarizer or the marking engine because it is difficult, conventionally, to observe the intermediate form of an image as it passes from the image binarizer to the marking engine, thereby hindering the determination of the root cause (source) of image quality problems.

Therefore, it is desirable to provide for the capturing of processed image data within the image output terminal in order to facilitate a more effective determination of the point of failure. By providing for the capturing of processed image data within the image output terminal, processed image data associated with a specific input (document or test image data) captured from a predefined access point in a malfunctioning printing system can be compared with the processed image data associated with the same specific input (document or test image data) captured from the same predefined access point.

BRIEF DESCRIPTION OF THE DRAWINGS

The drawings are only for purposes of illustrating an embodiment and are not to be construed as limiting, wherein.

DETAILED DESCRIPTION

Figure 1:
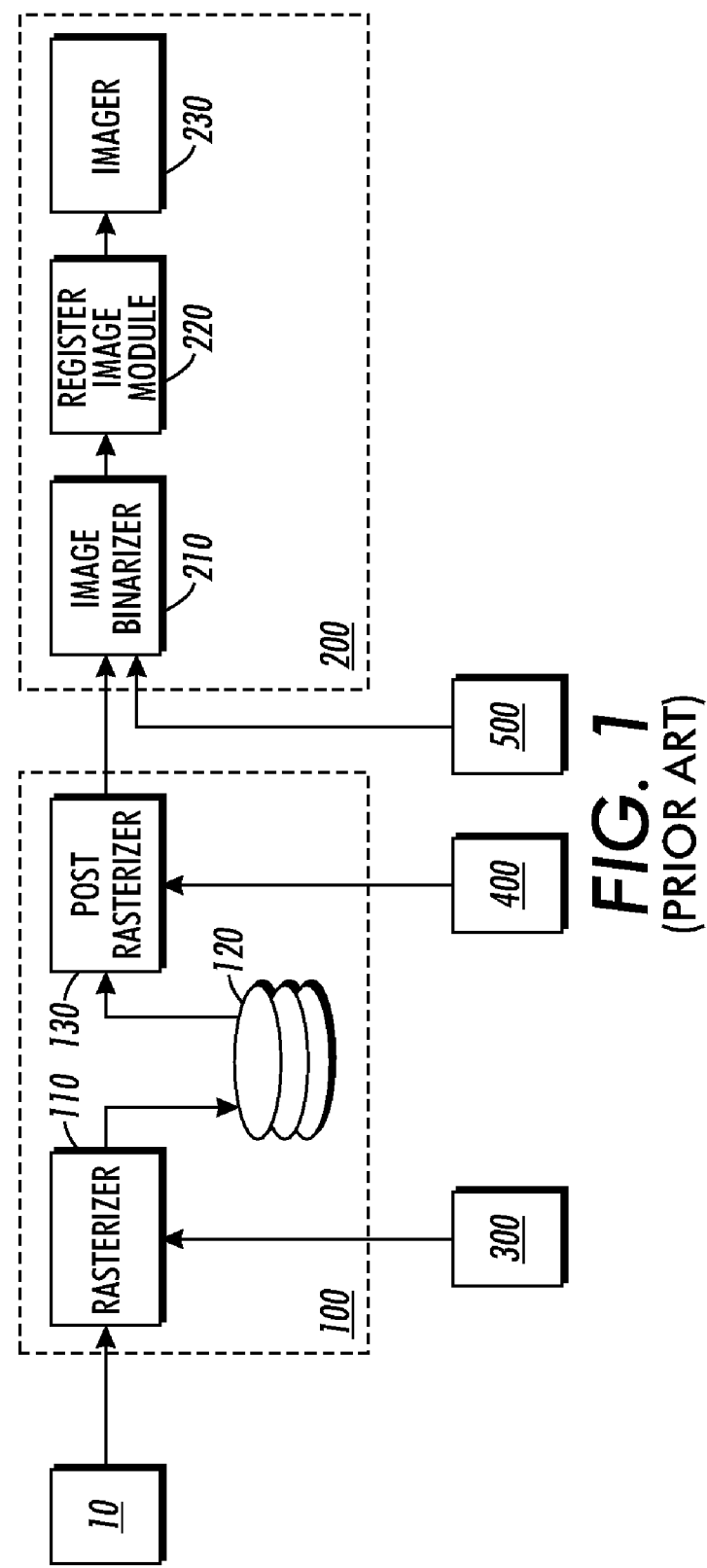
FIG. 1 illustrates a block diagram of a conventional printing system.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As noted above, it is desirable to provide for the capturing of processed image data at different points along the image processing pipeline in order to facilitate a more effective determination of the point of failure. By providing for the capturing of processed image data at different points along the image processing pipeline, processed image data associated with a specific input (document or test image data) captured from a predefined access point in a malfunctioning printing system can be compared with the processed image data associated with the same specific input (document or test image data) captured from the same predefined access point in a properly working image processing pathway.

Figure 2:
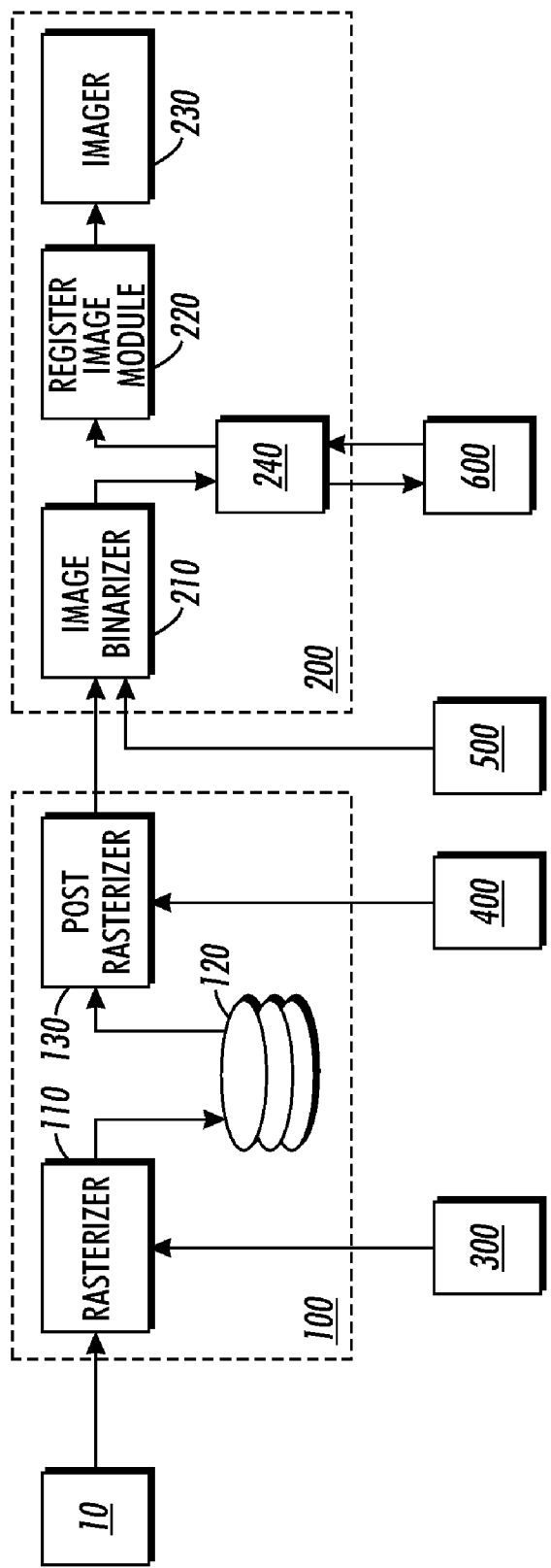
FIG. 2 illustrates a block diagram of a printing system wherein the image output terminal includes an access port for the capturing of processed image data.

A printing system that provides for the capturing of processed image data within the image output terminal is illustrated in FIG. 2, wherein the printing system includes an image output terminal 200 and a raster image processing engine 100. The raster image processing engine 100 receives image data 10 (an image file, a portable document format file, electronic document, or other electronic form of data containing data to be printed by the image output terminal 200).

The raster image processing engine 100 includes a rasterizer 110 that rasterizes the image data 10 before storing the processed image data in memory 120. The rasterizer 110 may perform portable document language interpretation, trapping, and/or anti-aliasing. The stored processed image data is processed by a post rasterizer 130. The post rasterizer 130 may perform calibration and/or tone-response-curve adjustment.

The raster image processing engine 100 also includes a port or ports to allow the user to input test image data (300 and 400) for calibration or diagnostic purposes. Moreover, the port or ports allow the user to sample (not shown) the processed test image data to determine the quality of the raster image processing engine 100 and the various components of the raster image processing engine 100.

Upon being processed by the raster image processing engine 100, the processed image data is, for example, binarized by image binarizer 210 of the image output terminal 200. It is noted that for purposes of describing the printing system, the print engine is a binary printer, namely the depth resolution of a pixel is one bit. However, the concepts described herein are readily applicable to a multi-level printer, namely a printer capable of rendering at pixel depth resolution greater than one, or a high addressability printer, namely a printer capable of rendering a predetermined number of subpixels (laser pulsewidth) for a pixel.

The image binarizer 210 prepares the image data so that the image data is printer dependent and at the proper resolution for rendering by the marking engine of the image output terminal 200. Thereafter, a register image module 220 makes any final adjustments to the image data with respect to registration and converts the image data into appropriate signals to be utilized by the imager 230. The imager 230 may be a laser for a xerographic printer or a printhead for ink printer.

The image output terminal 200 also allows the user to input test image data (500) for calibration or diagnostic purposes. This test image data (500) is processed by the image binarizer 210. To enable the determination of the quality of the image binarizer 210, image output terminal 200 of FIG. 2 includes a port 240.

Port 240 enables the sampling of the image data processed by the image binarizer 210 for diagnostic and calibration purposes. Moreover, port 240 enables the image data processed by the image binarizer 210 to be received by the register image module 220 so as to make any final adjustments to the image data with respect to registration and convert the image data into appropriate signals to be utilized by the imager 230. Lastly, port 240 enables preprocessed image data (image data not processed by image binarizer 210) to be fed directly the register image module 220 so as to make any final adjustments to the image data with respect to registration and convert the image data into appropriate signals to be utilized by the imager 230.

Port 240 may include an interface that allows an external image data source 600 to be connected thereto. As noted above, the external image data source 600 may provide preprocessed image data (image data not processed by image binarizer 210) to be fed directly the register image module 220 so as to make any final adjustments to the image data with respect to registration and convert the image data into appropriate signals to be utilized by the imager 230. Moreover, the external image data source 600 may enable the sampling of the image data processed by the image binarizer 210 for diagnostic and calibration purposes.

By providing port 240 in the image output terminal 200, a user can observe the intermediate form of an image as it passes from the image binarizer 210 to the marking engine, thereby facilitating the determination of the root cause (source) of image quality problems. Capturing the processed image data within the image output terminal enables the processed image data associated with a specific input (document or test image data) captured at port 240 can be compared with control processed image data associated with the same specific input (document or test image data). The comparison may be done offline at a remote computer or processing device.

Moreover, by providing port 240 in the image output terminal 200, a user can provide preprocessed image data (image data not processed by image binarizer 210) to be fed directly the register image module 220 so as to make any final adjustments to the image data with respect to registration and convert the image data into appropriate signals to be utilized by the imager 230, thereby facilitating the determination of the root cause (source) of image quality problems. The uploaded preprocessed image data can be rendered by the marking engine (through the register image module 220 and imager 230) onto a recording medium which enables the comparison of the rendered image data to a control rendered image (calibrated image). The comparison may be done offline by a user using a loupe or by high quality digital scanners.

It is noted that a peripheral memory device could be used as the external image data source 600 to both capture the processed image data from image binarizer 210 as well as to introduce preprocessed image data to be fed directly the register image module 220 so as to make any final adjustments to the image data with respect to registration and convert the image data into appropriate signals to be utilized by the imager 230. In this example, port 240 would include an interface that allowed such a memory device to interface therewith.

Moreover, port 240 may include a universal serial bus interface to allow an external image data source 600 (such as a removable flash memory or other removable memory device) to interface therewith. The removable memory device 600 enables the capture of images which can be readily transferable to a laptop or desktop personal computer. If a known set of image data is fed directly the image binarizer 210, the image data can processed by the image binarizer 210, and readily transferred to a laptop or desktop personal computer for the comparison routine. On the other hand, if a known set of preprocessed image data is fed directly the register image module 220 so as to make any final adjustments to the image data with respect to registration and convert the image data into appropriate signals to be utilized by the imager 230, the preprocessed image data can rendered by the marking engine and compared with a control rendering of the preprocessed image data. In either situation, the comparison can facilitate the determination of the root cause (source) of image quality problems in the image output terminal.

It is further noted that a networked memory device could be used as the external image data source 600 to both capture the processed image data from image binarizer 210 as well as to introduce preprocessed image data to be fed directly the register image module 220 so as to make any final adjustments to the image data with respect to registration and convert the image data into appropriate signals to be utilized by the imager 230.

In summary, a port is provided in an image output terminal so that a user can observe the intermediate form of an image as it passes from an image binarizer to the marking engine, thereby facilitating the determination of the root cause (source) of image quality problems. Moreover, the port provided in the image output terminal can provide preprocessed image data (image data not processed by an image binarizer) to be fed directly a register image module so as to make any final adjustments to the image data with respect to registration and convert the image data into appropriate signals to be utilized by an imager, thereby facilitating the determination of the root cause (source) of image quality problems.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system, comprising:
   a marking engine adapted to mark a medium with an image based on a print ready bitmap;
   an image pixel depth resolution converter to convert image data to a resolution renderable by said marking engine; and
   a port, operatively connected to said marking engine and said image pixel depth resolution converter, to enable image data processed by said image pixel depth resolution converter to be received by said marking engine for rendering;
   said port enabling sampling of the image data processed by said image pixel depth resolution converter by an external memory.

2. The printing system as claimed in claim 1, wherein said port enables uploading of preprocessed image data, from the external memory, to be rendered by said marking engine without processing by said image pixel depth resolution converter.

3. The printing system as claimed in claim 1, wherein said port includes an interface to allow connection to a peripheral memory device.

4. The printing system as claimed in claim 1, wherein said port includes a universal serial bus interface to allow connection to a peripheral memory device.

5. The printing system as claimed in claim 1, wherein said port includes a universal serial bus interface to allow connection to a flash memory device.

6. The printing system as claimed in claim 1, wherein said port includes a universal serial bus interface to allow connection to a removable memory device.

7. A printing system, comprising:
   a marking engine adapted to mark a medium with an image based on a print ready bitmap;
   an image pixel depth resolution converter to convert image data to a resolution renderable by said marking engine; and
   a port, operatively connected to said marking engine and said image pixel depth resolution converter, to enable image data processed by said image pixel depth resolution converter to be received by said marking engine for rendering;
   said port enabling uploading of preprocessed image data, from an external memory, to be rendered by said marking engine without processing by said image pixel depth resolution converter.

8. The printing system as claimed in claim 7, wherein said port includes an interface to allow connection to a peripheral memory device.

9. The printing system as claimed in claim 7, wherein said port includes a universal serial bus interface to allow connection to a peripheral memory device.

10. The printing system as claimed in claim 7, wherein said port includes a universal serial bus interface to allow connection to a flash memory device.

11. The printing system as claimed in claim 7, wherein said port includes a universal serial bus interface to allow connection to a removable memory device.

* * * * *